US010291398B2

(12) United States Patent
Kanemoto et al.

(10) Patent No.: US 10,291,398 B2
(45) Date of Patent: May 14, 2019

(54) COMMUNICATION DEVICE, COMMUNICATION METHOD, READER/WRITER, AND COMMUNICATION SYSTEM

(71) Applicant: SONY CORPORATION, Tokyo (JP)

(72) Inventors: Toshinori Kanemoto, Kanagawa (JP); Teiichi Shiga, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/222,168

(22) Filed: Jul. 28, 2016

(65) Prior Publication Data

US 2017/0005793 A1 Jan. 5, 2017

Related U.S. Application Data

(63) Continuation of application No. 12/436,521, filed on May 6, 2009, now Pat. No. 9,407,446.

(30) Foreign Application Priority Data

May 13, 2008 (JP) .................................. 2008-126151

(51) Int. Cl.
*H04L 9/00* (2006.01)
*H04L 9/08* (2006.01)
(Continued)

(52) U.S. Cl.
CPC .......... *H04L 9/0838* (2013.01); *H04L 9/0891* (2013.01); *H04L 9/3273* (2013.01);
(Continued)

(58) Field of Classification Search
CPC .................................................... H04L 9/0838
(Continued)

(56) References Cited

U.S. PATENT DOCUMENTS 5,602,918 A * 2/1997 Chen ................... G06Q 20/341
380/281
7,003,671 B1 2/2006 Kusakabe et al.
(Continued)

FOREIGN PATENT DOCUMENTS

CN 101162495 4/2008
EP 1855430 11/2007
(Continued)

OTHER PUBLICATIONS

Japanese Office Action dated Nov. 6, 2012 for corresponding Japanese Appln. No. 2008-126151.
(Continued)

*Primary Examiner* — Christopher J Brown
(74) *Attorney, Agent, or Firm* — K&L Gates LLP

(57) ABSTRACT

A control unit of a communication device decrypts, when receiving via an antenna from a reader/writer a cipher key encrypted with a key same as a common key recorded in a recording unit by the reader/writer, the encrypted cipher key with the common key recorded in the recording unit, and when receiving via the antenna from the reader/writer a readout target address specifying a region of a data readout source in the recording unit encrypted with a cipher key same as the cipher key by the reader/writer, decrypting the encrypted readout target address with the cipher key, and transmitting the data recorded in the region specified by the readout target address obtained through decryption of the regions of the recording unit to the reader/writer via the antenna.

13 Claims, 9 Drawing Sheets

(51) Int. Cl.
*H04L 9/32* (2006.01)
*H04W 12/04* (2009.01)
*H04L 29/06* (2006.01)
*H04W 12/06* (2009.01)

(52) U.S. Cl.
CPC ......... *H04L 63/0442* (2013.01); *H04W 12/04* (2013.01); *H04L 2209/80* (2013.01); *H04W 12/06* (2013.01)

(58) Field of Classification Search
USPC .......................................................... 713/169
See application file for complete search history.

(56) References Cited

U.S. PATENT DOCUMENTS

| | | | |
|---|---|---|---|
| 2002/0166058 A1 | 11/2002 | Fueki | |
| 2003/0081790 A1 | 5/2003 | Kallahalla et al. | |
| 2005/0094805 A1 | 5/2005 | Satoshi et al. | |
| 2006/0117190 A1 | 6/2006 | Morita | |
| 2006/0133614 A1 | 6/2006 | Zhang et al. | |
| 2007/0076886 A1 | 4/2007 | Hori et al. | |
| 2008/0189554 A1* | 8/2008 | Ali | G06F 13/10 713/189 |
| 2009/0259798 A1* | 10/2009 | Wang | G06F 3/0607 711/103 |
| 2009/0259850 A1 | 10/2009 | Ishibashi | |
| 2010/0150347 A1 | 6/2010 | Teruyama | |

FOREIGN PATENT DOCUMENTS

| | | |
|---|---|---|
| EP | 2006065885 | 3/2009 |
| JP | 04-091531 | 3/1992 |
| JP | 04-256196 | 9/1992 |
| JP | 10-004403 | 1/1998 |
| JP | 10-20780 | 1/1998 |
| JP | 10-247906 | 9/1998 |
| JP | 2002-279390 | 9/2002 |
| JP | 2005-27338 | 1/2005 |
| JP | 2005-050320 | 2/2005 |
| JP | 2005-122725 | 5/2005 |
| JP | 2005-229147 | 8/2005 |
| JP | 2006-031640 | 2/2006 |
| JP | 2006-094068 | 4/2006 |
| JP | 2006-209281 | 8/2006 |
| JP | 2007-293481 | 11/2007 |
| JP | 2007-293788 | 11/2007 |
| JP | 2007-329884 | 12/2007 |

OTHER PUBLICATIONS

Korean Office Action dated Jan. 6, 2015 for corresponding Korean Appln. No. 2013-139306.
Chinese Office Action dated Aug. 1, 2011 for corresponding Chinese Appln. No. 200910136489.4.
European Office Action dated Sep. 17, 2009 for corresponding European Patent Appln. No. 09 00 6413.
Search and Examination Report dated Jul. 26, 2010 for corresponding Singapore Patent Appln. No. 200902861-4.

* cited by examiner

READOUT REQUEST (Read_Req)

READOUT RESPONSE (Read_Res)

CIPHER KEY UPDATE REQUEST (Write_SK_Req)

CIPHER KEY UPDATE RESPONSE (Write_SK_Res)

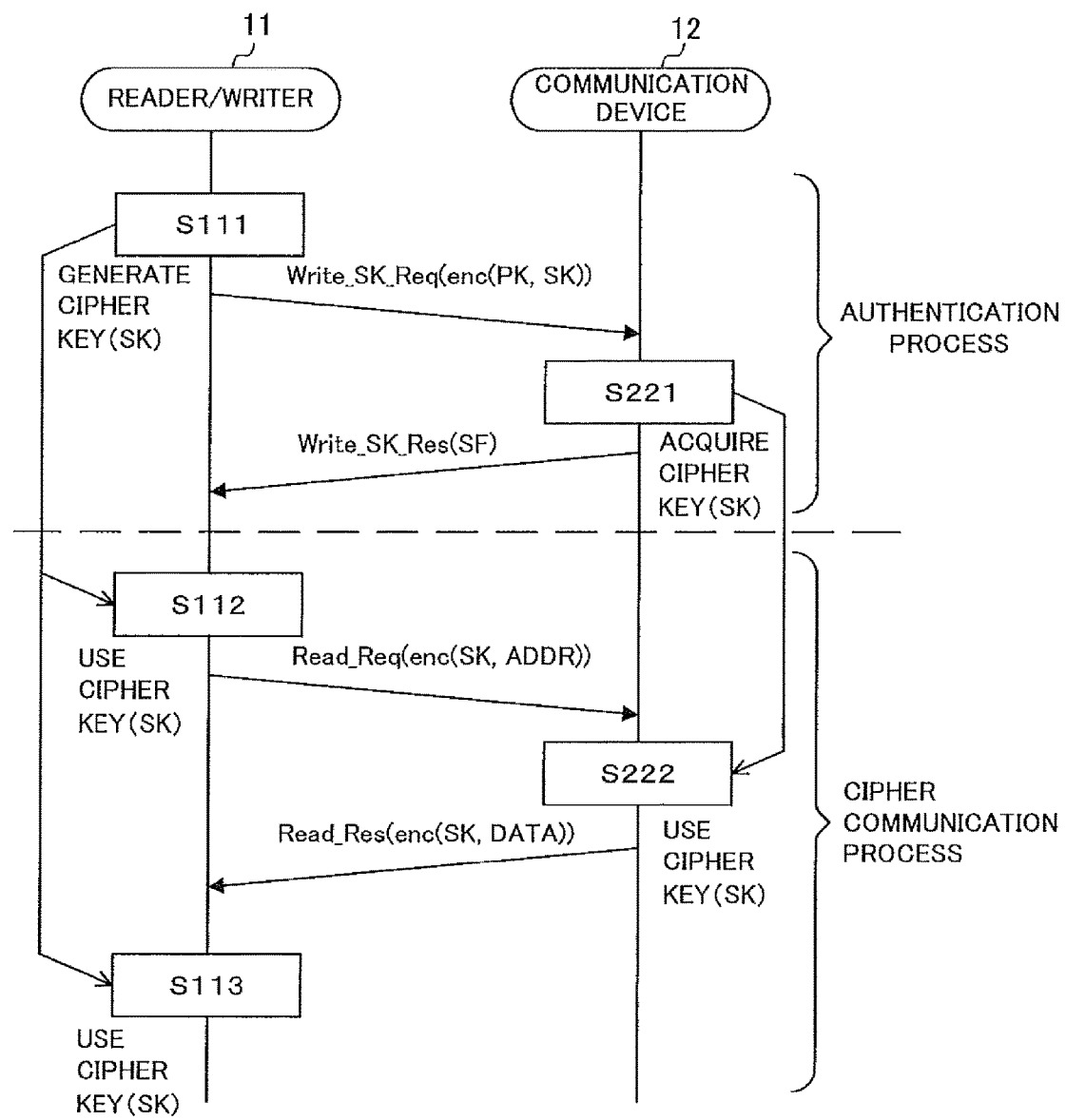

WRITE REQUEST (Write_Req)

CIPHER TARGET

WRITE RESPONSE (Write_Res)

CIPHER TARGET

CIPHER KEY GENERATION REQUEST (Read_SK_Req)

CIPHER KEY GENERATION RESPONSE (Read_SK_Res)

CIPHER TARGET

COMMUNICATION DEVICE, COMMUNICATION METHOD, READER/WRITER, AND COMMUNICATION SYSTEM

CROSS REFERENCES TO RELATED APPLICATIONS

The present application is a continuation application of U.S. patent application Ser. No. 12/436,521 filed on May 6, 2009, which claims priority to Japanese Priority Patent Application JP 2008-126151 filed in the Japan Patent Office on May 13, 2008, the entire content of each of which is hereby incorporated by reference herein.

BACKGROUND

The present application relates to a communication device, a communication method, a reader/writer, and a communication system. More specifically, the present application relates to a technique of performing readout or write of data with respect to a communication device from a reader/writer.

In a communication system such as an IC card system and the like of the related art, mutual authentication is performed for every communication session to generate a cipher key in order for the reader/writer to perform cipher communication and securely perform readout/write of data of the communication device (see e.g., Japanese Patent Application Laid-Open No. 2005-27338 and Japanese Patent Application Laid-Open No. 10-20780). According to such method, authentication is performed by generating a random number by a random number generation means of each of first and second information processing devices, replacing that in which the random number is encrypted using the key set in advance, and determining whether or not it can be correctly decrypted.

[Patent Document 1] Japanese Patent Application Laid-Open No. 2005-27338

[Patent Document 2] Japanese Patent Application Laid-Open No. 10-20780

SUMMARY

However, the method based on such mutual authentication is used to prevent tapping and spoofing by a third information processing device, but is based on the random number generation of each of the first and second information processing devices, encryption of the random number, and transmission regardless of the application. Thus, the efficiency is not satisfactory, and the processing time is long.

The present application addresses the above-identified, and other issues associated with methods in related art and apparatuses, and it is desirable to provide a new and improved technique enabling the reader/writer to perform readout or write at high speed while maintaining safety with respect to the data of the communication device.

According to an embodiment, there is provided a communication device including a communication unit for transmitting and receiving signals with a reader/writer; a recording unit recorded with data and also recorded with a common key which is a key commonly used with the reader/writer; and a control unit for, when receiving via the communication unit from the reader/writer a cipher key update request signal containing a cipher key encrypted with a key same as the common key recorded in the recording unit by the reader/writer, decrypting the encrypted cipher key contained in the cipher key update request signal with the common key recorded in the recording unit, and recording the cipher key obtained through decryption in the recording unit, and when receiving via the communication unit from the reader/writer a readout request signal containing a readout target address specifying a region of a data readout source in the recording unit encrypted with a cipher key same as the cipher key by the reader/writer, decrypting the encrypted readout target address contained in the readout request signal with the cipher key recorded in the recording unit, and transmitting the data recorded in the region specified by the readout target address obtained through decryption of the regions of the recording unit to the reader/writer via the communication unit.

According to another embodiment, there is provided a communication device including a communication unit for transmitting and receiving signals with a reader/writer; a recording unit recorded with data and also recorded with a common key which is a key commonly used with the reader/writer; and a control unit for, when receiving via the communication unit from the reader/writer a cipher key generation request signal requesting for generation of a cipher key, generating a cipher key through a predetermined procedure, encrypting the generated cipher key with the common key recorded in the recording unit, and transmitting a cipher key generation response signal containing the encrypted cipher key to the reader/writer via the communication unit, and when receiving via the communication unit a write request signal containing write target data encrypted by the reader/writer and write target address specifying a region of write destination of the encrypted write target data in the recording unit, decrypting the encrypted write target data and the encrypted write target address with the cipher key recorded in the recording unit, and recording the write target data obtained through decryption in a region specified by the write target address obtained through decryption of the regions of the recording unit.

According to an embodiment described above, a technique enabling the read/writer to perform readout or write at high-speed on the data in the communication device while maintaining safety is provided.

Additional features and advantages of the present application are described in, and will be apparent from, the following Detailed Description and the figures.

BRIEF DESCRIPTION OF THE FIGURES

FIG. 7 is a sequence chart showing flow of process in time of data readout by the communication system according to an embodiment;

DETAILED DESCRIPTION

Figure 1:
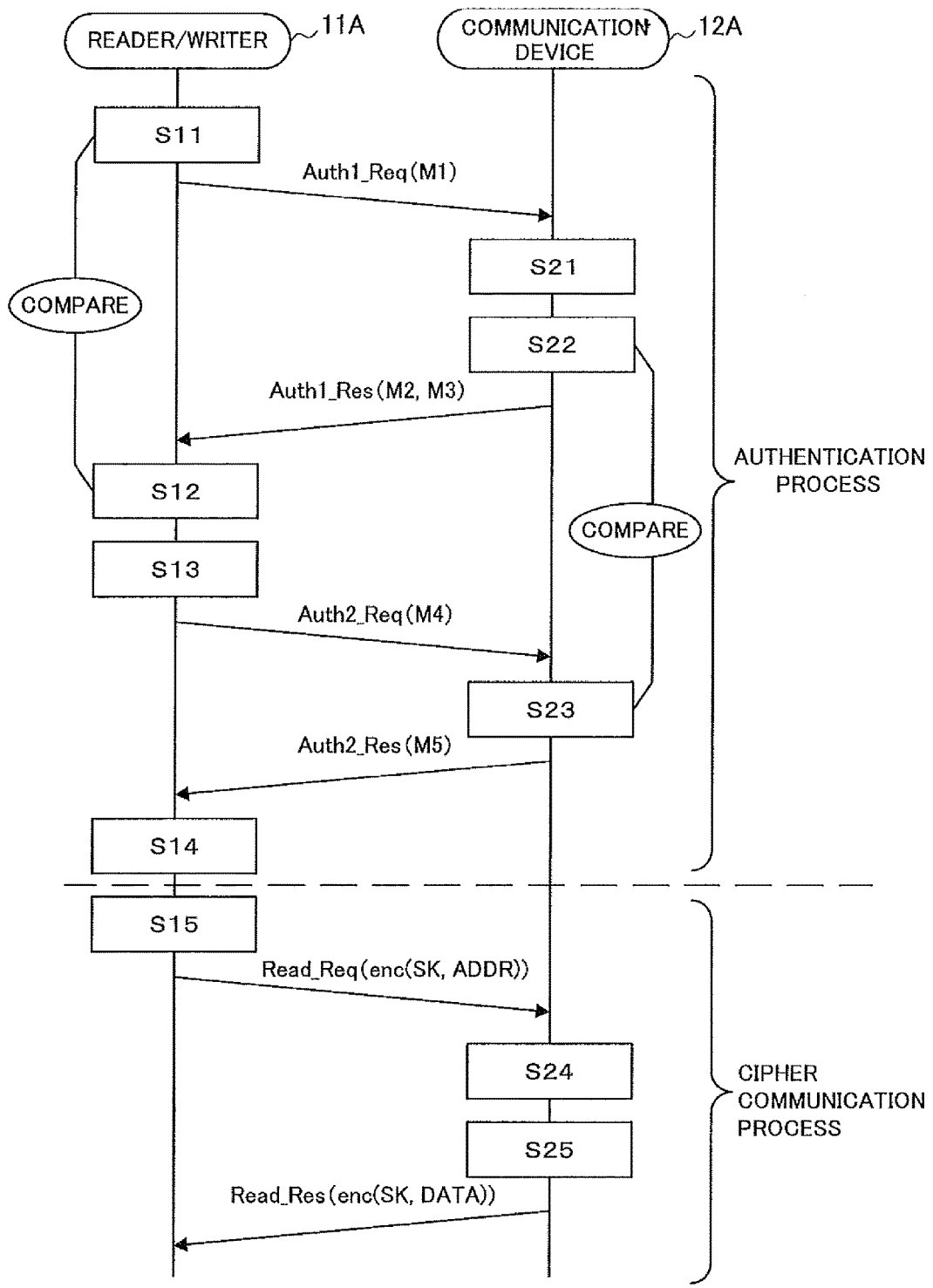
FIG. 1 is a sequence chart showing an authentication process in time of data readout in a general communication system.

The present application will be described in detail with reference to the appended drawings according to an embodiment. Note that in this specification and the appended drawings, structural elements that have substantially the same functions and structures are denoted with the same reference numerals and a repeated explanation of these structural elements is omitted.

FIG. 1 is a sequence chart showing an authentication process in time of data readout in a general communication system. The authentication process in time of data readout in the general communication system will be described with reference to FIG. 1.

The authentication process is generally carried out through a method using a symmetrical cipher algorithm defined in ISO/IEC (International Organization for Standardization/International Electrotechnical Commission) 9798-2 and JIS (Japanese Industrial Standards) X5056-2.

First, in step S11, a reader/writer 11A generates a first random number A, encrypts the random number A through a predetermined procedure using a common key B serving as an authentication key, and obtains encrypted data M1. M1 is transmitted to a communication device 12A as a parameter of Auth1_Req. In step S21, the communication device 12A receiving the Auth1_Req decrypts the M1 of the parameter of the Auth1_Req through a predetermined procedure using the common key B and obtains the random number A. Subsequently, the communication device 12A encrypts the random number A through a predetermined procedure using a common key A to obtain encrypted data M2.

In step S22, the communication device 12A generates a second random number B, and encrypts the second random number B through a predetermined procedure using the common key A to obtain encrypted data M3. The communication device 12A returns the M2 and the M3 to the reader/writer 11A as parameters of the Auth1_Res.

In step S12, the reader/writer 11A receiving the Auth1_Res decrypts the M2 of the parameter of the Auth1_Res through a predetermined procedure using the common key A, and compares and checks if the obtained value is the same value as the random number A generated in step S11. If check is made, the reader/writer 11A will know that the communication device 12A holds the same common keys A and Bas itself.

Thereafter, in step S13, the reader/writer 11A decrypts the M3 of the parameter of the Auth1_Res through a predetermined procedure using the common key A, and obtains the random number B. Thereafter, the reader/writer 11A encrypts the random number B through a predetermined procedure using the common key B, and obtains encrypted data M4. The reader/writer 11A transmits the M4 to the communication device 12A as a parameter of Auth2_Req.

In step S23, the communication device 12A receiving the Auth2_Req decrypts the M4 of the parameter Auth2_Req through a predetermined procedure using the common key B, and compares and checks if the obtained value is the same value as the random number B generated in step S22. If check is made, the communication device 12A will know that the reader/writer 11A holds the same common keys A and B as itself.

Thereafter, communication device 12A generates a cipher key (SK) for encrypting and decrypting a communication path and a session ID (SID) for identifying the mutual authentication process through a predetermined procedure from the obtained random numbers A, B. A code indicating that the session ID and the mutual authentication are successful is encrypted through a predetermined procedure using the cipher key SK to obtain encrypted data M5. The communication device 12A returns the M5 to the reader/writer 11A as a parameter of Auth2_Res.

In step S14, the reader/writer 11A receiving the Auth2_Req generates a cipher key (SK) for encrypting and decrypting a communication path and a session ID (SID) for identifying the mutual authentication process through a predetermined procedure from the random numbers A, B obtained up to now. The M5 of the parameter of Auth2_Res is decrypted through a predetermined procedure using the cipher key SK, and check is made that the code indicating that the session ID and the mutual authentication are successful is obtained to thereby complete the authentication process.

After the authentication process is terminated, the cipher communication process can be executed. In FIG. 1, the data readout request Read_Req from the communication device 12A is encrypted and transmitted after the authentication process. The Read_Req is defined as a configuration containing a request identifier and a readout target address (see FIG. 6A). In step S15, the reader/writer 11A encrypts all fields excluding the request identifier of the Read_Req through a predetermined procedure by the cipher key SK shared in the mutual authentication process, and transmits the same to the communication device 12A.

Similar to S15, in step S24, the communication device 12A receiving the Read_Req decrypts all the fields excluding the request identifier of the Read_Req through a predetermined procedure by the cipher key SK shared in the mutual authentication process, and obtains a Read_Req of plain text. The communication device 12A reads out the data from the specified address according to the Read_Req of plain text, and set it as a parameter of the Read_Res. The Read_Res is defined as a configuration containing a response identifier, a result code, and a readout target data (see FIG. 6B). Similar to the Read_Req, with regards to the Read_Res, the communication device 12A encrypts all the fields excluding the response identifier through a predetermined procedure by the cipher key SK shared in the mutual authentication process, and returns the same to the reader/writer 11A.

Figure 2:
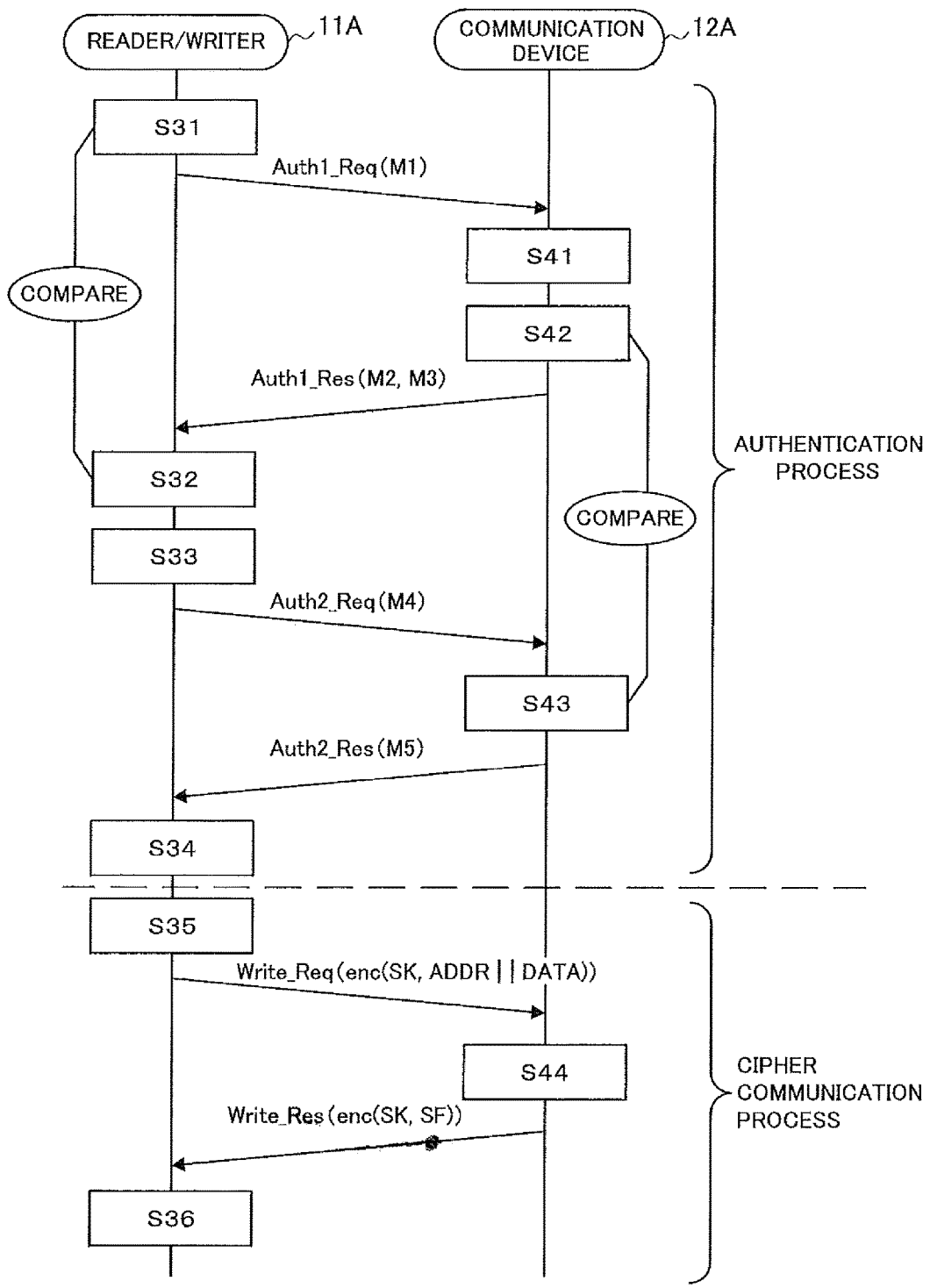
FIG. 2 is a sequence chart showing an authentication process of writing data in the general communication system.

FIG. 2 is a sequence chart showing the authentication process of writing data in the general communication system. The authentication process of writing data in the general communication system will be described with reference to FIG. 2.

In FIG. 2, a data write request Write_Req to the communication device 12A is encrypted and transmitted after the authentication process similar to FIG. 1. The Write_Req is defined as a configuration containing a request identifier, a write target address, and a write target data (see FIG. 8A).

In step S35, the reader/writer 11A encrypts all the fields excluding the request identifier of the Write_Req through a predetermined procedure by the cipher key SK shared in the mutual authentication process, and transmits the same to the communication device 12A.

Similar to S35, in step S44, the communication device 12A receiving the Write_Req decrypts all the fields excluding the request identifier of the Write_Req through a predetermined procedure by the cipher key SK shared in the mutual authentication process, and obtains a Write_Req of plain text. The communication device 12A writes the specified data to the specified address according to the Write_Req of plain text, and sets the result code as a parameter of the Write_Res. The Write_Res is defined as a configuration containing a response identifier and a result code (see FIG. 8B). Similar to the Write_Req, with regards to the Write_Res, the communication device 12A encrypts all the fields excluding the response identifier through a predetermined procedure by the cipher key SK shared in the mutual authentication process, and returns the same to the reader/writer 11A.

Figure 3:
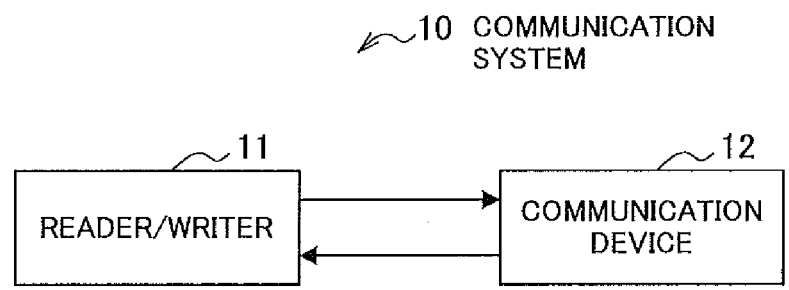
FIG. 3 is a view showing a configuration of a communication system according to an embodiment.

FIG. 3 is a view showing a configuration of a communication system according to an embodiment of the present application. The communication system according to the embodiment of the present application will be described with reference to FIG. 3.

As shown in FIG. 3, the communication system 10 is configured by a reader/writer 11 and a communication device 12, which wirelessly communicate, where data is transmitted and received in a non-contact manner between the reader/writer 11 and the communication device 12 using electromagnetic wave. The general wireless communication system assumed here performs cipher communication through the following procedures.

The reader/writer 11 radiates electric wave (electromagnetic wave) and performs processing such as polling to detect the communication device 12. When the communication device 12 approaches the reader/writer 11, and the reader/writer 11 detects the communication device 12, the reader/writer 11 and the communication device 12 transmit and receive predetermined data to perform the authentication process. The reader/writer 11 encrypts a request signal to the communication device 12 using the cipher key and the session ID generated and shared in the authentication process, and transmits the same. The request signal includes a request signal requesting for overwrite of the predetermined data, a request signal requesting for transmission of the predetermined data, and the like.

When receiving the request signal transmitted from the reader/writer 11, the communication device 12 decrypts the request signal using the shared cipher key, checks the consistency with the shared session ID, and then performs the requested process and returns a code indicating success or fail.

In the present embodiment, each authentication process is separated and made independent for secure readout/write of data to the communication device 12 which is the security device so that the command sequence is optimized to the usage method. When performing the readout process from the security device, the side making the readout request generates the cipher key (session key), and transmits the same to the side to be read out. The side to be read out then encrypts the readout data using the cipher key (session key) and transmits the same. When performing the write process from the security device, the side to be written generates the cipher key (session key), and transmits the same to the side making the write request. The side to write then encrypts the write data using the cipher key (session key) and transmits the same. The update of the authentication or the update of the session key on the communication device 12 which is the security device is then performed at higher speed.

In this method, the cipher key (session key) is encrypted using a common key shared between the security devices (between reader/writer 11 and communication device 12) to confidentially transmit the cipher key (session key).

The system in which the access right is separated can be realized by using the session key or the common key different for the readout process and the write process with respect to the data region of the communication device 12.

Figure 4:
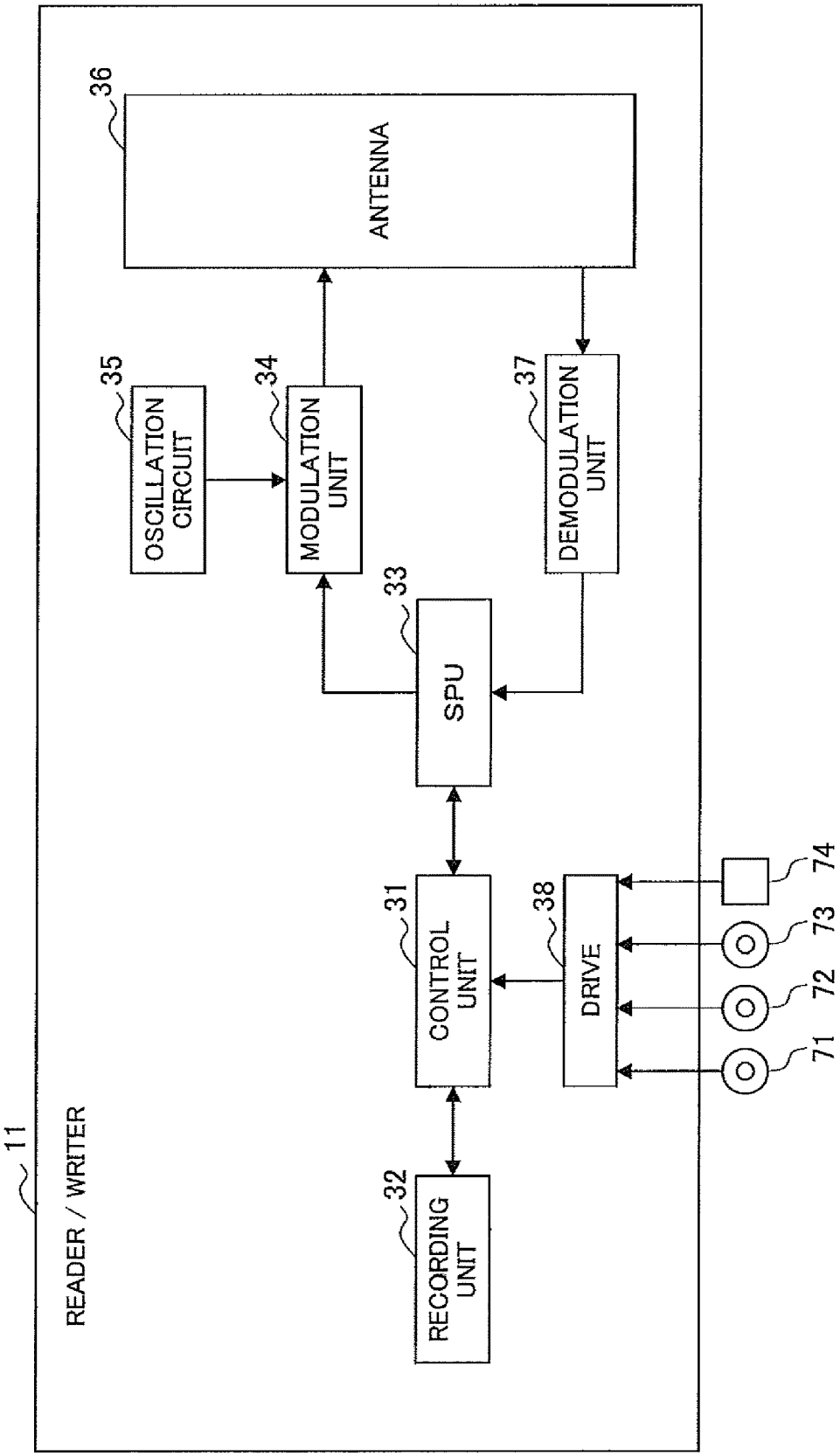
FIG. 4 is a block diagram showing a configuration of the function of a reader/writer according to an embodiment.

FIG. 4 is a block diagram showing a configuration of the function of the reader/writer according to the embodiment of the present application. The reader/writer according to the embodiment of the present application will be described with reference to FIG. 4.

The reader/writer 11 is configured to include a control unit 31, a recording unit (second recording unit) 32, a SPU (Signal Processing Unit) 33, a modulation unit 34, an oscillation circuit 35, an antenna 36 serving as one example of a communication unit, a demodulation unit 37, and a drive 38.

The control unit 31 generates a request signal requesting for overwrite of data including predetermined data. The control unit 31 also generates a request signal requesting for transmission of the predetermined data.

The control unit 31 generates data to be stored in the request signal requesting for overwrite of the data. The control unit 31 generates the cipher key through a predetermined procedure when reading out the data. The control unit 31 encrypts the generated cipher key with a readout common key recorded in the recording unit 32, and provides a cipher key update request signal (see FIG. 6C) containing the encrypted cipher key to the SPU 33. The cipher key request update signal is transmitted to the communication device 12 via the antenna 36. The control unit 31 encrypts the readout target address specifying the region of the data readout source in a non-volatile memory 106 (see FIG. 5) by the generated cipher key, and provides the readout request signal (see FIG. 6A) containing the encrypted readout target address to the SPU 33. The readout request signal is transmitted to the communication device 12 via the antenna 36.

When writing the data, the control unit 31 provides a cipher key generation request signal (see FIG. 8C) requesting for generation of the cipher key to the SPU 33. The cipher key generation request signal is transmitted to the communication device 12 via the antenna 36. When the cipher key generation response signal (see FIG. 8D) containing the cipher key encrypted with the key same as the write common key recorded in the recording unit 32 by the communication device 12 is received via the antenna 36 from the communication device 12 and provided from the SPU 33, the control unit 31 decrypts the encrypted cipher key contained in the cipher key generation response signal with the write common key recorded in the recording unit 32, records the cipher key obtained by decryption in the recording unit 32, encrypts the write target data and the write target address specifying the region of write destination of the write target data in the non-volatile memory 106 with the cipher key recorded in the recording unit 32, and provides the write request signal (see FIG. 8A) containing the encrypted write target data and the encrypted write target address to the SPU 33. The write request signal is transmitted to the communication device 12 via the antenna 36.

The control unit 31 is configured by a CPU (Central Processing Unit) and the like, and reads the program provided from the driver 38, which is attached as desired, and executes the read program. If programs and data are provided from the drive 38, the control unit 31 provides the provided programs and data to the recording unit 32, as desired, reads the program recorded in the recording unit 32, and executes the read program.

The recording unit 32 is a so-called non-volatile storage medium or recording medium that is rewritable and that can hold the recorded content even if the power is cut off, and for example, is configured by a hard disc, flash memory, or the like. The recording unit 32 records various data. The recording unit 32 provides the recorded data to the control unit 31 as desired.

The recording unit 32 records at least one of the readout common key or the write common key as the key commonly used with the communication device 12. The recording unit 32 provides the recorded common key to the control unit 31. The recording unit 32 also records data provided from the control unit 31.

The SPU 33 codes the request signal provided from the control unit 31 through a predetermined method, and provides the coded request signal to the modulation unit 34. The SPU 33 decodes a response signal provided from the demodulation unit 37 through a method corresponding to the coding method of the response signal, and provides the decoded response signal to the control unit 31.

For example, when the request signal to transmit to the communication device 12 is provided from the control unit 31, the SPU 33 performs a coding process such as coding to a Manchester code on the relevant request signal, and outputs the obtained signal to the modulation unit 34. When the response signal from the communication device 12 is provided from the demodulation unit 37, the SPU 33 performs a decoding process such as decoding of the Manchester code on the relevant data, and provides the obtained signal to the control unit 31.

The modulation unit 34 generates a carrier wave based on the clock signal of a predetermined frequency provided from the oscillation circuit 35. The modulation unit 34 modulates the request signal provided from the SPU 33 through the predetermined method based on the carrier wave to generate a request signal, and provides the modulated request signal to the antenna 36. For instance, the modulation unit 34 generates a modulated request signal by changing the phase, amplitude, frequency, and the like of the carrier wave based on the request signal provided from the SPU 33.

More specifically, the modulation unit 34 ASK (Amplitude Shift Keying) modulates the data provided by the SPU 33 with the clock signal having a frequency of 13.56 MHz provided from the oscillation circuit 35 as the carrier wave, and outputs the generated modulation wave to the antenna 36 as electromagnetic wave.

The oscillation circuit 35 generates the clock signal of a predetermined frequency that becomes a reference, and provides the generated clock signal to the modulation unit 34.

The antenna 36 transmits the request signal provided from the modulation unit 34 to the communication device 12 by wireless communication. In other words, the antenna 36 radiates electric wave for transmitting the request signal provided from the modulation unit 34. The antenna 36 also receives the response signal transmitted from the communication device 12, and provides the received response signal to the demodulation unit 37.

The demodulation unit 37 demodulates the response signal provided from the antenna 36 through a demodulation method corresponding to the modulation method of the modulation unit 109 (see FIG. 3), and provides the demodulated response signal to the SPU 33. For instance, the demodulation unit 37 demodulates the modulation wave (ASK modulation wave) acquired through the antenna 36, and outputs the demodulated response signal to the SPU 33.

When a magnetic disc 71, an optical disc 72, a magneto-optical disc 73, or a semiconductor memory 74 is attached, the drive 38 drives the same to acquire the recorded program, data and the like. The acquired program and data are transferred to the control unit 31 or the communication device 12. The program transferred (transmitted) to the communication device 12 is recorded or executed, as necessary, by the communication device 12.

Figure 5:
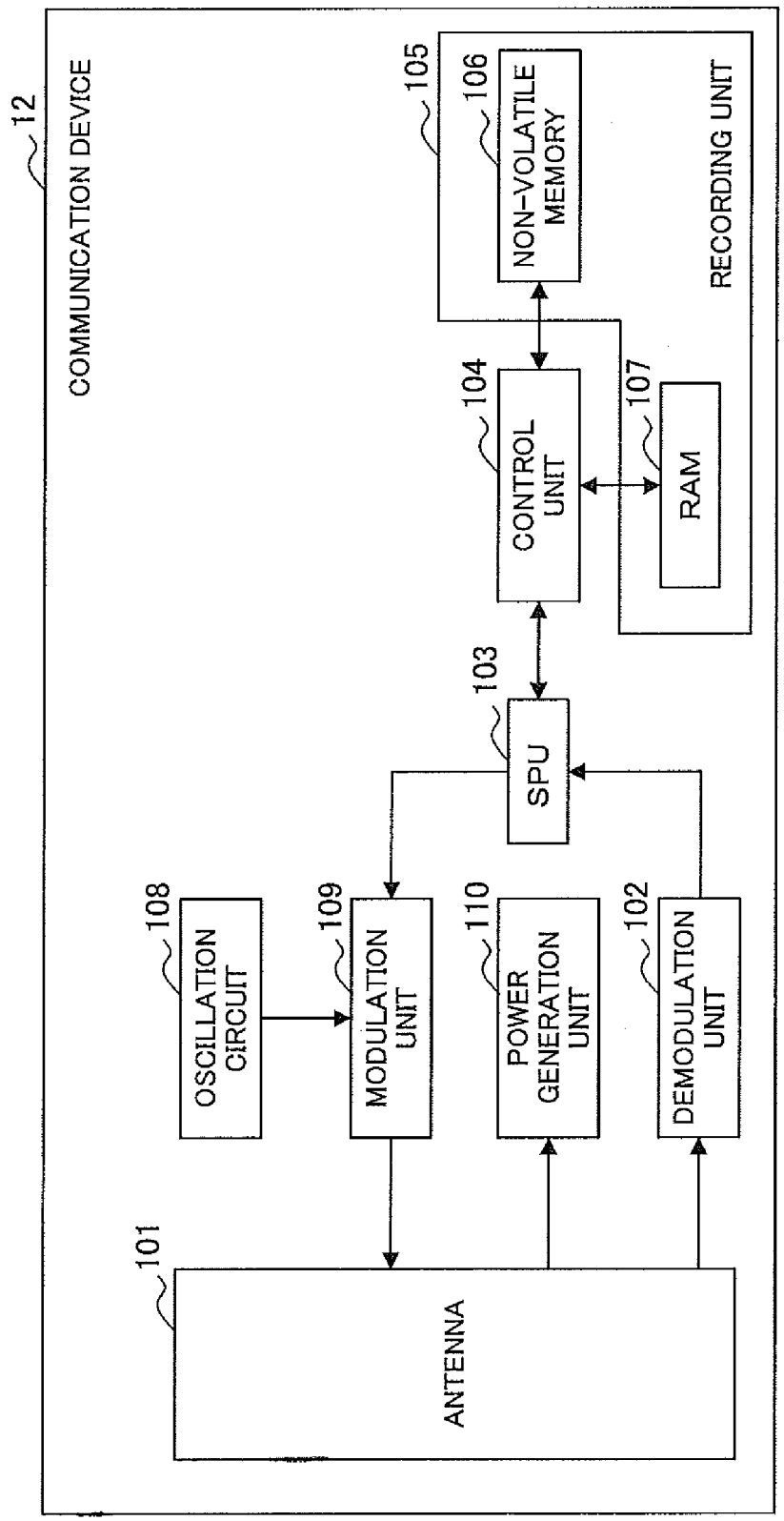
FIG. 5 is a block diagram showing a configuration of a function of the communication device according to an embodiment.

FIG. 5 is a block diagram showing a configuration of a function of the communication device according to the present embodiment. The communication device according to the embodiment of the present application will be described with reference to FIG. 5.

The communication device 12 is configured to include an antenna 101 serving as one example of a communication unit, a demodulation unit 102, a SPU 103, a control unit 104, a recording unit (first recording unit) 106, a RAM (Random Access Memory) 107, an oscillation circuit 108, a modulation unit 109, and a power generation unit 110.

The antenna 101 receives the request signal transmitted from the reader/writer 11, and provides the received request signal to the demodulation unit 102. The antenna 101 transmits the response signal provided from the modulation unit 109 to the reader/writer 11 by wireless communication. In other words, the antenna 101 radiates the electric wave for transmitting the response signal provided from the modulation unit 109. At the antenna 101, resonance occurs by the electric wave of a predetermined frequency radiated from the reader/writer 11, thereby generating electromotive force.

The demodulation unit 102 demodulates the request signal provided from the antenna 101 through a demodulation method corresponding to the modulation method of the modulation unit 34 (see FIG. 2), and provides the demodulated request signal to the SPU 103. For instance, the demodulation unit 102 envelope detects the request signal which is the ASK modulation wave received via the antenna 101 and demodulates the same, and outputs the demodulated request signal to the SPU 103.

The SPU 103 decodes the request signal provided from the demodulation unit 102 through a predetermined method, and provides the decoded request signal to the control unit 104. The SPU 103 codes the response signal provided from the control unit 104 through a predetermined coding method, and provides the coded response signal to the modulation unit 109. For instance, if the data demodulated in the demodulation unit 102 is coded through the Manchester method, the SPU 103 decodes the data (decode the Manchester code) based on the clock signal provided from a PLL (Phase Locked Loop) circuit (not shown), and provides the decoded data to the control unit 104. For instance, the SPU 103 codes the response signal provided from the control unit 104 through the Manchester method, and provides the coded response signal to the modulation unit 109.

The control unit 104 is configured by a CPU (Central Processing Unit), and the like, and its function is realized by executing a program stored in the RAM 107. The cipher key update request signal (see FIG. 6C) containing the cipher key encrypted with the key same as the readout common key recorded in the non-volatile memory 106 by the reader/writer 11 is received via the antenna 101 from the reader/writer 11, and provided from the SPU 103. When the cipher key update request signal is provided, the control unit 104 decrypts the encrypted cipher key contained in the cipher key update request signal by the readout common key recorded in the non-volatile memory 106, and records the cipher key obtained through decryption in the RAM 107. The cipher key obtained through decryption is recorded in the RAM 107 but may be recorded in the non-volatile memory 106.

The control unit 104 may determine a cipher key update request flag contained in the write request signal when the write request signal is provided. When determining that the value requesting for the cipher key update is set in the cipher key update request flag, such write request signal is recognized as the cipher key update request signal. The existing write request signal then can be used as the cipher key update request signal, and thus the development efficiency enhances.

The readout request signal containing the readout target address specifying the region of the data readout source in the non-volatile memory 106 encrypted with the cipher key same as the above cipher key by the reader/writer 11 is received from the reader/writer 11 via the antenna 101, and provided to the control unit 104 from the SPU 103. When the readout request signal is provided, the control unit 104 decrypts the encrypted readout target address contained in the readout request signal with the cipher key recorded in the RAM 107, and provides to the SPU 103 the data recorded in the region specified by the readout target address obtained through decryption of the regions of the non-volatile memory 106. This data is transmitted to the reader/writer 11 via the antenna 101.

The cipher key generation request signal (see FIG. 8C) requesting for the generation of the cipher key is received from the reader/writer 11 via the antenna 101, and provided to the control unit 104 from the SPU 103. When the cipher key generation request signal is provided, the control unit 104 generates the cipher key through a predetermined procedure, and encrypts the generated cipher key by the write common key recorded in the non-volatile memory 106. The control unit 104 provides the cipher key generation response signal (see FIG. 8D) containing the encrypted cipher key to the SPU 103. This signal is transmitted to the reader/writer 11 via the antenna 101.

The control unit 104 may determine a cipher key generation request flag contained in the readout request signal when the readout request signal is provided. When determining that the value requesting for the cipher key update is set in the cipher key generation request flag, such readout request signal is recognized as the cipher key generation request signal. The existing readout request signal then can be used as the cipher key generation request signal, and thus the development efficiency enhances.

The write request signal (see FIG. 8A) containing the write target data encrypted by the reader/writer 11 and the write target address specifying the region of the write destination of the write target data in the non-volatile memory 106 is received via the antenna 101, and is provided to the control unit 104 by the SPU 103. When the write request signal is provided, the control unit 104 decrypts the encrypted write target data and the encrypted write target address with the cipher key recorded in the RAM 107. The cipher key is assumed to be recorded in the RAM 107 herein, but may be recorded in the non-volatile memory 106. The control unit 104 records the write target data obtained through decryption in the region specified by the write target address obtained through decryption of the regions of the non-volatile memory 106.

The recording unit 105 is configured to include the non-volatile memory 106, the RAM 107 and the like. The non-volatile memory 106 is configured by a nonvolatile memory such as flash memory, EEPROM, MRAM, FeRAM or the like. The non-volatile memory 106 records various data such as confidential data to be transmitted to the reader/writer 11 and data for the execution of the program. The non-volatile memory 106 also records at least one of the readout common key or the write common key as the key commonly used with the reader/writer 11.

The RAM 107 appropriately stores data for the execution of the program, and the like. The RAM 107 provides the stored data to the control unit 104.

The oscillation circuit 108 generates the clock signal having a frequency same as the frequency of the request signal received by the antenna 101, and provides the generated clock signal to the modulation unit 109. The oscillation circuit 108 incorporates a PLL circuit, and generates a clock signal having the same frequency as the clock frequency of the request signal.

The modulation unit 109 generates a carrier wave based on the clock signal of a predetermined frequency provided from the oscillation circuit 108. The modulation unit 109 modulates the response signal provided from the SPU 103 through a predetermined method based on the carrier wave to generate the response signal, and provides the modulated response signal to the antenna 101. For instance, the modulation unit 109 further ASK modulates the response signal coded through the Manchester method provided from the SPU 103, and transmits the modulated response signal to the reader/writer 11 via the antenna 101.

The modulation unit 109 turns ON/OFF a predetermined switching element (not shown) with respect to the response signal provided from the SPU 103, and connects a predetermined load in parallel to the antenna 101 only when the switching element is in the ON state to fluctuate the load of the antenna 101. The ASK modulated response signal is transmitted to the reader/writer 11 via the antenna 101 by the fluctuation of the load of the antenna 101 (fluctuate terminal voltage of the antenna 36 of the reader/writer 11).

The power generation unit 110 generates a direct current (DC) power based on the alternating current (AC) electromotive force generated at the antenna 101, and supplies the generated DC power to each unit of the communication device 12.

The present application aims to simplify the authentication process of such system according to application, and increasing the speed of the process with the encryption strength as is. In other words, the application is broadly divided into readout request with encryption and write request with encryption using the cipher key generated using a certain common key.

When performing the readout request (Read_Req) with encryption, the random number generated by the reader/writer 11 is used as the cipher key. The reader/writer 11 transmits to the communication device 12 the Write_SK_Req requesting for the update of the cipher key as the authentication process before transmitting the Read_Req.

FIG. 6 is a block diagram showing a structure of the data used in data readout by the communication system according to the embodiment of the present application. The structure of the data used in data readout by the communication system according to the embodiment of the present application will be described with reference to FIG. 6.

Figure 6A:
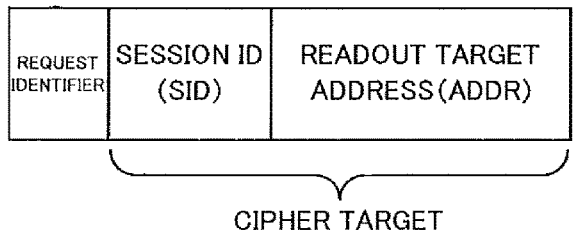
FIGS. 6A-6D are block diagrams showing a structure of the data used in data readout by the communication system according to an embodiment.

As shown in FIG. 6A, the readout request (Read_Req) includes a request identifier for identifying the request, a session ID (SID) for identifying the session, and a readout target address (ADDR) for specifying the region of the data readout source in the non-volatile memory 106 (see FIG. 5).

As shown in FIG. 6A, the session ID (SID) and the readout target data (DATA) are the encryption targets.

Figure 6B:
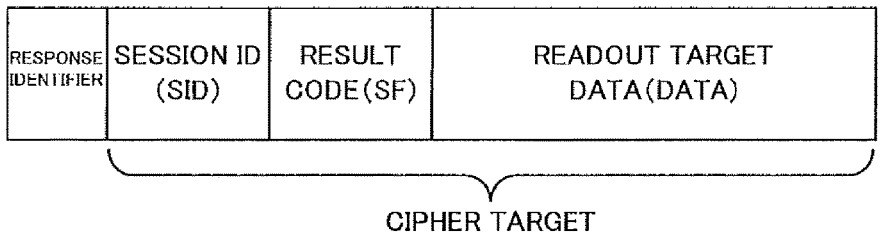

As shown in FIG. 6B, the readout response (Read_Res) includes a response identifier for identifying the response, a session ID (SID) for identifying the session, a result code (SF) indicating the processing result with respect to the request, and a readout target data (DATA) read out from the non-volatile memory 106 (see FIG. 5). As shown in FIG. 6B, the session ID (SID), the result code (SF), and the readout target data (DATA) are the encryption targets.

Figure 6C:
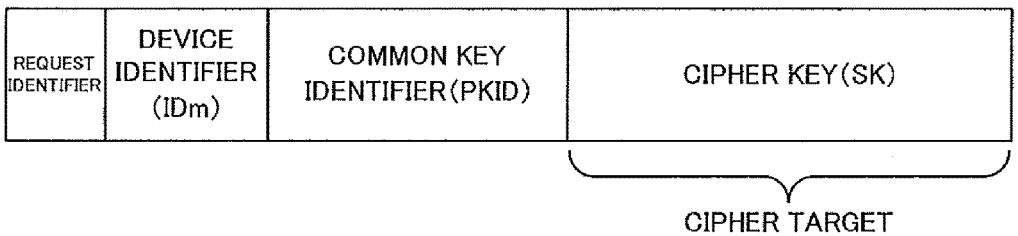

As shown in FIG. 6C, the cipher key update request (Write_SK_Req) includes a request identifier for identifying the request, a device identifier (IDm) for identifying the communication device 12 (see FIG. 2), a common key identifier (PKID) for identifying the common key, and the cipher key (SK). As shown in FIG. 6C, the cipher key (SK) is the encryption target.

Figure 6D:
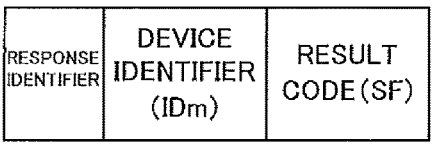

As shown in FIG. 6D, the cipher key update response (Write_SK_Res) includes a response identifier for identifying the response, a device identifier (IDm) for identifying the communication device 12 (see FIG. 2), and a result code (SF) indicating the processing result with respect to the request.

FIG. 7 is a sequence chart showing flow of process in time of data readout by the communication system according to the embodiment of the present application. The process in time of data readout by the communication system according to the embodiment of the present application will be described with reference to FIG. 7.

In step S111, the reader/writer 11 generates the cipher key (SK). That is, the reader/writer 11 generates a random number, and holds it as the cipher key (SK). The reader/writer 11 then encrypts the same through a predetermined procedure using a common key (PK) serving as an authentication key to obtain encrypted data Enc (PK, SK). The reader/writer 11 transmits the Enc (PK, SK) to the communication device 12 as a parameter of the Write_SK_Req.

In step S221, the communication device 12 receiving the Write_SK_Req decrypts the Enc (PK, SK) of the parameter of the Write_SK_Req through a predetermined procedure using the common key (PK) corresponding to the common key identifier (PKID) to obtain the cipher key (SK). The cipher key (SK) thus can be shared between the reader/writer 11 and the communication device 12. In one embodiment, the Write_SK Res contains a success/fail determination code (SF) as the parameter, which is returned to the reader/writer 11. The subsequent cipher communication process is the same as the example shown in FIG. 1, and thus will be omitted.

A high speed cipher communication sharing the session key (cipher key) can be realized in a system of performing only secure readout from the security device (communication device 12) through the process in time of data readout described above.

Specifically, the cipher communication can be realized at high speed since data can be read out by performing communication between the reader/writer 11 and the communication device 12 for two laps. The cipher communication can be realized at high speed since the communication device 12 may not perform the process of generating the random number (process of generating the key). The safety is also maintained since the data transmitted and received between the reader/writer 11 and the communication device 12 is encrypted.

FIG. 8 is a block diagram showing a structure of the data used in data write by the communication system according to the embodiment of the present application. The structure of the data used in data write by the communication system according to the embodiment of the present application will be described with reference to FIG. 8.

Figure 8A:
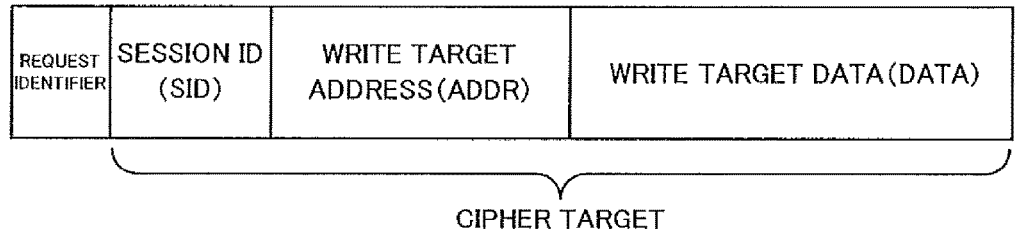
FIGS. 8A-8D are block diagrams showing a structure of the data used in data write by the communication system according to an embodiment.

As shown in FIG. 8A, the write request (Write_Req) includes a request identifier for identifying the request, a session ID (SID) for identifying the session, a write target address (ADDR) for specifying the region of the data write destination in the nonvolatile memory 106 (see FIG. 5), and write target data (DATA). As shown in FIG. 8A, the session ID (SID), the write target address (ADDR), and the write target data (DATA) to write in the non-volatile memory 106 (see FIG. 5) are the encryption targets.

Figure 8B:
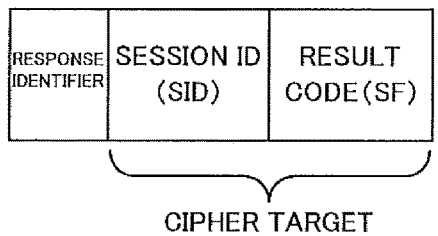

As shown in FIG. 8B, the write response (Write_Res) includes a response identifier for identifying the response, a session ID (SID) for identifying the session, and a result code (SF) indicating the processing result with respect to the request. As shown in FIG. 8B, the session ID (SID), and the result code (SF) are the encryption targets.

Figure 8C:
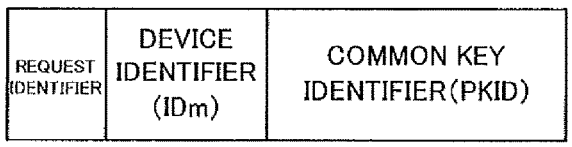

As shown in FIG. 8C, the cipher key generation request (Read_SK_Req) includes a request identifier for identifying the request, a device identifier (IDm) for identifying the communication device 12 (see FIG. 2), and a common key identifier (PKID) for identifying the common key.

Figure 8D:
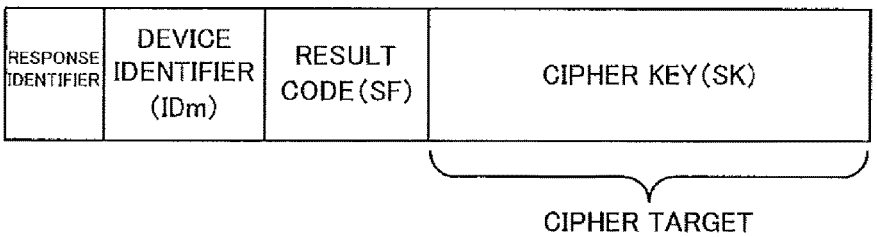

As shown in FIG. 8D, the cipher key generation response (Read_SK_Res) includes a response identifier for identifying the response, a device identifier (IDm) for identifying the communication device 12 (see FIG. 2), a result code (SF) indicating the processing result with respect to the request, and the cipher key (SK). As shown in FIG. 8D, the cipher key (SK) is the encryption target.

Figure 9:
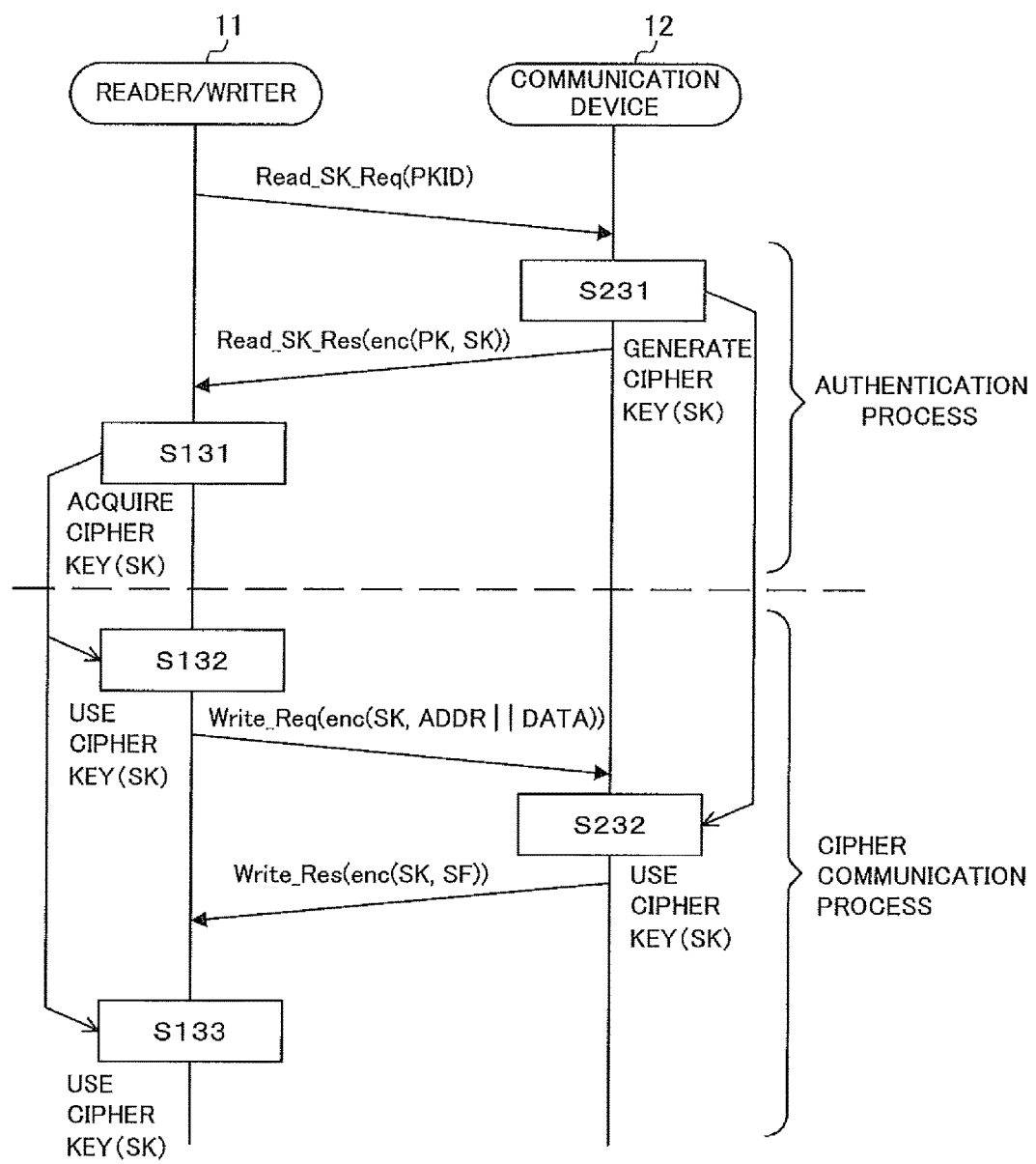
FIG. 9 is a sequence chart showing flow of process in time of data write by the communication system according to an embodiment.

FIG. 9 is a sequence chart showing flow of process in time of data write by the communication system according to the embodiment of the present application. The process in time of data write by the communication system according to the embodiment of the present application will be described with reference to FIG. 9.

The reader/writer 11 first transmits the Read_SK_Req to the communication device 12. In this case, the identifier (PKID) of the common key (PK) is simultaneously transmitted as the parameter. In step S231, the communication device 12 receiving the Read_SK_Req generates the cipher key (SK). In other words, the communication device 12 generates the random number and holds it as the cipher key (SK). The communication device 12 then encrypts the cipher key (SK) through a predetermined procedure using a common key (PK) corresponding to the common key identifier (PKID) to obtain encrypted data Enc (PK, SK). The communication device 12 transmits the Enc (PK, SK) to the reader/writer 11 as a parameter of the Read_SK_Res.

In step S131, the reader/writer 11 receiving the Read_SK_Res decrypts the Enc (PK, SK) of the parameter of the Read_SK_Res through a predetermined procedure using the common key (PK) to obtain the cipher key (SK). The cipher key (SK) thus can be shared between the reader/writer 11 and the communication device 12. The subsequent cipher communication process is the same as the example shown in FIG. 2, and thus will be omitted.

A high speed cipher communication sharing the session key (cipher key) can be realized in a system of performing only secure write to the security device (communication device 12) through the process in time of data write described above. Specifically, the cipher communication can be realized at high speed since data can be written by performing communication between the reader/writer 11 and the communication device 12 for two laps. The cipher communication can be realized at high speed since the reader/writer 11 may not perform the process of generating the random number (process of generating the key). The safety can be also maintained since the data transmitted and received between the reader/writer 11 and the communication device 12 is encrypted.

The communication system 10 may perform both the process in time of data readout and the process in time of data write described above. In this case, the authentication or the cipher communication using a key value different for the readout process and the write process can be realized with respect to the data region of the security device (communication device 12). In this case, the safety on the attack to both the data readout and the data write enhances since the key value used in time of data readout and the key value used in time of data write are different.

The present application is also applicable to an information processing system for transmitting and receiving data, an electronic money system using the IC card, a security system, and the like through wired or wireless communication network.

It should be understood that various changes and modifications to the presently preferred embodiments described herein will be apparent to those skilled in the art. Such changes and modifications can be made without departing from the spirit and scope of the present application and without diminishing its intended advantages. It is therefore intended that such changes and modifications be covered by the appended claims.

The invention is claimed as follows:

1. A communication method for a communication device, comprising:
   generating a first session key by encrypting at least a random value with a first common key, wherein the first common key is shared with an information processing apparatus and held by the communication device at a first time;
   in response to receiving a read command, transmitting a first message encrypted with the first session key, the read command including information addressing first data relating to the first message;
   generating a second session key by encrypting a seed value with a second common key, which has a different key value than the first common key and is held by the communication device at the first time; and
   in response to receiving a write command, writing second data into a memory, the write command including a second message relating to the second data, at least a part of the second message encrypted with the second session key.

2. The communication method according to claim 1, wherein the seed value is different from the random value.

3. The communication method according to claim 2, wherein the random value is generated in the information processing apparatus.

4. The communication method according to claim 3, wherein the seed value is generated in the communication device.

5. The communication method according to claim 4, wherein the read command is received from the information processing apparatus.

6. The communication method according to claim 5, wherein the method further comprising decrypting the at least a part of second message before writing the data into the memory.

7. The communication method according to claim 1, wherein the seed value is another random value.

8. A communication device, comprising:
   a memory unit configured to store a first common key, wherein the first common key is shared with an information processing apparatus and held by the communication device at a first time;
   a controller configured to generate a first session key by encrypting a random value with the common key, and generate a second session key by encrypting a seed value with a second common key, which has a different key value than the first common key and is held by the communication device at the first time; and
   a communication unit configured to:
   transmit a first message encrypted with the first session key in response to a read command that includes information addressing first data relating to the first message,
   receive a second message, at lease a part of the second message encrypted with the second session key, and
   the controller further configured to write second data into the memory, wherein the second data is included in the second message.

9. The communication device according to claim 8, wherein the seed value is different from the random value.

10. The communication device according to claim 9, wherein the random value is generated in the information processing apparatus.

11. The communication device according to claim 10, wherein the read command is received from the information processing apparatus.

12. The communication device according to claim 11, wherein the controller further configured to decrypt the at least a part of second message and write the second data into the memory.

13. The communication device according to claim 8, wherein the seed value is another random value.

* * * * *